(12) United States Patent
Tsukui et al.

(10) Patent No.: US 7,078,846 B2
(45) Date of Patent: Jul. 18, 2006

(54) ROTARY ACTUATOR AND METHOD OF CONTROLLING AN ACTUATOR

(75) Inventors: Michio Tsukui, Takasaki (JP); Kenji Sutou, Nitta-gun (JP); Yuko Kawakura, Yamada-gun (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 11/059,656

(22) Filed: Feb. 17, 2005

(65) Prior Publication Data

US 2005/0140317 A1    Jun. 30, 2005

Related U.S. Application Data

(62) Division of application No. 10/245,339, filed on Sep. 18, 2002, now Pat. No. 6,876,129.

(30) Foreign Application Priority Data

Sep. 26, 2001   (JP)   ............................. 2001-293017
Jan. 17, 2002   (JP)   ................................. 2002-8279

(51) Int. Cl.
*H02N 2/00*     (2006.01)
*H01L 41/09*    (2006.01)
*H01L 41/053*   (2006.01)

(52) U.S. Cl. ...................................................... 310/317
(58) Field of Classification Search ................. 310/317
See application file for complete search history.

(56) References Cited

U.S. PATENT DOCUMENTS

| 4,339,682 | A | | 7/1982 | Toda et al. ................. 310/328 |
|---|---|---|---|---|
| 5,786,654 | A | * | 7/1998 | Yoshida et al. .............. 310/328 |
| 5,917,267 | A | * | 6/1999 | Miyazawa et al. ........... 310/317 |
| 6,084,363 | A | * | 7/2000 | Mizumoto .................... 318/116 |
| 6,211,602 | B1 | * | 4/2001 | Yoshida et al. .......... 310/323.01 |
| 6,211,607 | B1 | * | 4/2001 | Kanbara ...................... 310/328 |
| 6,218,764 | B1 | * | 4/2001 | Yoshida et al. .............. 310/317 |
| 6,232,700 | B1 | * | 5/2001 | Kosaka et al. .......... 310/323.17 |
| 6,239,534 | B1 | | 5/2001 | Takeuchi et al. ............. 310/321 |
| 6,483,226 | B1 | * | 11/2002 | Okada .......................... 310/328 |
| 6,876,129 | B1 | * | 4/2005 | Tsukui et al. ................ 310/328 |

FOREIGN PATENT DOCUMENTS

| JP | 2-192176 | | 7/1990 | ................... 310/328 |
|---|---|---|---|---|
| JP | 4-69070 | * | 3/1992 | ................... 310/317 |
| JP | 9-137343 | | 5/1997 | |
| JP | 2003-219666 | * | 7/2003 | |

* cited by examiner

*Primary Examiner*—Thomas M. Dougherty
(74) *Attorney, Agent, or Firm*—Wenderoth, Lind & Ponack, L.L.P.

(57) ABSTRACT

A piezoelectric drive body is secured to a shaft that is rotatably supported by a holder. A leaf spring is fastened to the upper end of the holder and is in resilient contact with the upper end of the shaft. Friction between the shaft and the leaf spring acts as a rotation-suppressing force on the shaft. When a sawtooth-waveform voltage is applied to the drive body, the drive body vibrates to the right and left. The drive body rotates around the shaft in a specific direction, due to the difference in inertial force resulting from the difference in the deforming speed of the body. The voltage linearly rises and falls repeatedly or has a sinusoidal waveform. In either case, the voltage rises from a minimum to a maximum for time $T_1$ and falls from the maximum to the minimum for time $T_2$ that is different from time $T_1$.

17 Claims, 13 Drawing Sheets

ROTARY ACTUATOR AND METHOD OF CONTROLLING AN ACTUATOR

This application is a divisional application of application Ser. No. 10/245,339, filed Sep. 18, 2002 now U.S. Pat No. 6,676,129.

BACKGROUND OF THE INVENTION

1. Field of the Invention

The present invention relates to a rotary actuator having a drive body that is rotated around its rotation axis. More particularly, the invention relates to a technique that is useful when applied to wipers for cars, outdoor monitor cameras, and meters such as speedometers. This invention also relates to a method of controlling an actuator that is driven by the vibration of an electromechanical transducer such as a piezoelectric element. More particularly, the invention relates to a method of controlling an actuator that can reduce the noise the actuator makes when the input voltage changes.

2. Description of Related Art

Hitherto, a rod-shaped member such as a wiper blade is driven to wipe a glass pane, and a rod-shaped member such as the pointer of a meter or a hand of a clock is driven to indicate a numerical value. Generally, wipers, meters and clocks use rotary actuators driven by electromagnetic motors or hydraulic or air pressure. Electromagnetic motors and the like are considerably large. Due to their sizes, their design and installation are limited. For example, it is desired that a small CCD camera be equipped with a wiper to clean the front of the camera, but a wiper with a motor or an actuator cannot be used because it decreases the view field of the camera and occupies a large space. Most conventional drive mechanisms comprising an electromagnetic motor or the like require a decelerator, a link and the like, besides the electromagnetic motor or the like. Inevitably, the drive mechanism tends to be massive and heavy, and has problems concerning space and weight. The manufacturing cost of the drive mechanism is high, due to its size and weight.

SUMMARY OF THE INVENTION

An object of the present invention is to provide a rotary actuator that has a simple structure, not having an electromagnetic motor or the like, and can yet drive a rod-shaped member. Another object of the invention is to decrease the noise that the actuator generates while operating.

To attain these objects, an actuator according to this invention comprises a drive body having at least one part which vibrates; a shaft member on which the drive body is mounted; a bearing section supporting the shaft member and allowing the shaft member to rotate; and a resistance member for applying a rotation-suppressing force to the shaft member to suppress rotation of the shaft member. As the drive body vibrates, the shaft member supported by the bearing section rotates. The drive body rotates or oscillates. Basically, the drive body rotates, though the actuator has a simple structure, comprising only four parts, i.e., the drive body, the shaft member, the bearing section and the rotation-suppressing member. Having neither an electromagnetic motor nor a link mechanism, the actuator in which a drive body formed as a rod-shaped member or the like rotates can be small and light. Since a position to mount the actuator is not restricted by a motor or link, the apparatus layout can be improved. The actuator can be provided in a narrow and small space.

In the actuator, the rotation-suppressing member may apply the rotation-suppressing force in the form of a frictional force. If this is the case, the rotation-suppressing member may be provided at the bearing section. Alternatively, the rotation-suppressing member may be a leaf spring set in resilient contact with the shaft member. The leaf spring may be set in resilient contact with an end portion or a side of the shaft member. The rotation-suppressing member may be provided on the shaft member. The rotation-suppressing member may be an engagement strip set in resilient contact with the bearing section.

Moreover, the drive body may be, for example, a piezoelectric element of bimorph type. In this case, a voltage having a sawtooth waveform may be applied to the drive body.

Further, the shaft member may have a hollow extending in its axial direction, and a wire may extend through the hollow to supply electric power to the drive body. The drive body may be provided in the form of a plurality of bodies that are secured to the shaft member.

A wiper apparatus according to this invention comprises a wiper blade to be placed on a wipe surface. The wiper blade has a drive body that vibrates at least one part. The wiper apparatus also includes a shaft member on which the wiper blade is mounted. The wiper apparatus further includes a bearing section for supporting the shaft member and allowing the shaft member to rotate. A resistance member is also included for applying a rotation-suppressing force to the shaft member to suppress the rotation of the shaft member. As the drive body vibrates, the wiper blade supported by the bearing section rotates, and the wiper blade rotates or oscillates. The wiper apparatus can therefore be small and light without using an electromagnetic motor and a link mechanism. Since a position to mount the actuator is not restricted by a motor or link, the apparatus layout can be improved. The actuator can be provided in a narrow and small space.

The wiper apparatus may be configured to be arranged at the front of a CCD camera. If used in such a manner, the apparatus may be incorporated in a wiper unit that is attachable to the front of the CCD camera. Further, the wiper apparatus may be applied to a CCD camera mounted on a car.

An indicator according to this invention comprises a pointer composed of a drive body having at least one part which vibrates. The indicator also includes a shaft member on which the pointer is mounted, and a bearing section for supporting the shaft member and allowing the shaft member to rotate. The indicator further includes a resistance member for applying a rotation-suppressing force to the shaft member to suppress rotation of the shaft member. As the drive body vibrates, the pointer supported by the bearing section rotates, and the pointer rotates or oscillates. The indicator can therefore be small and light without using an electromagnetic motor. The drive body may be attached to the pointer, not formed integral with the pointer. Moreover, the drive body, not the pointer, may be fastened to the shaft member. In this case, the pointer is secured to the drive body.

The indicator may be a speedometer in which the pointer indicates a speed of a car. In this case, the indicator may further comprise a sensor for detecting a position of the pointer.

A motor according to the present invention comprises a drive body having at least one part which vibrates. The motor also includes a shaft member on which the drive body is mounted, and a bearing section for supporting the shaft member and allowing the shaft member to rotate. The motor further includes a resistance member for applying a rotation-suppressing force to the shaft member to suppress rotation of the shaft member. In the motor of the invention, as the drive body vibrates, the shaft member rotates in a predetermined direction. The drive body may be a piezoelectric element of bimorph type. The section that applies a drive force to the shaft member can be light. The motor can therefore be small and light, have a small inertia and can quickly respond to the input power.

According to the invention there is provided a method of controlling an actuator which is driven by a vibration of an electromechanical transducer generated by a change of a voltage applied to the electromechanical transducer. The applied voltage rises linearly from a minimum value to a maximum value for time $T_1$, and falls linearly from the maximum value to the minimum value for time $T_2$ that is different from time $T_1$. The voltage may change along a curve near the maximum value and the minimum value.

According to this invention there is provided a method of controlling an actuator which is driven by a vibration of an electromechanical transducer generated by a change of a voltage applied to the electromechanical transducer. The applied voltage has a sinusoidal waveform, rises from a minimum value to a maximum value for time $T_1$, and falls from the maximum value to the minimum value for time $T_2$ that is different from time $T_1$.

In this method, the voltage has a linear waveform which the time $T_1$ is different from the time $T_2$, or a sinusoidal waveform applied to the electromechanical transducer. In either case, a difference in the deforming speed of the transducer can be acquired, a force large enough to drive the actuator can be generated, and a rapid change of the voltage can be mitigated. Therefore, the operation noise can be greatly reduced without reducing the force for driving the actuator, and quietness of the actuator can be improved.

In a method of controlling an actuator which is driven by vibration of an electromechanical transducer generated by a change of a voltage applied to the electromechanical transducer, the voltage applied to the electromechanical transducer has a trapezoidal waveform and remains at a minimum value for a predetermined time and at a maximum value for a predetermined time. In this method, the voltage may change along a curve at both ends of the upper and lower sides of the trapezoidal waveform. Further, the voltage having the trapezoidal waveform may rise from a minimum value to a maximum value for time $T_1$ and fall from the maximum value to the minimum value for time $T_2$ that is different from time $T_1$. When the voltage having this waveform is applied to the electromechanical transducer, the change of the voltage can be mitigated and the noise that the actuator makes while operating can decrease, because the peaks of the voltage are not sharp edges.

The voltage may rise from a minimum value to a maximum value for time $T_1$ and may fall from the maximum value to the minimum value for time $T_2$, said time $T_1$ and said time $T_2$ having a ratio $T_1:T_2$ ranging from 0.95:0.05 to 0.8:0.2 or ranging from 0.05:0.95 to 0.2:0.8. The operation noise of the actuator can be reduced while sufficient force to drive it.

According to the present invention there is provided a method of controlling an actuator which is driven by vibration of an electromechanical transducer generated by a change of a voltage applied to the electromechanical transducer. The voltage changes along a curve near a maximum value and a minimum value. Namely, the voltage gently changes near the maximum and minimum values, and can remain at either peak for some time. The peaks of the voltage are not sharp edges, which reduces the noise the actuator makes while operating.

Moreover, the electromechanical transducer used in the method of controlling the actuator, described above, may be a piezoelectric element of bimorph type made of piezoelectric ceramic.

The above-described and other objects, and novel features of the present invention will become more fully apparent from the following description of the following specification in conjunction with the accompanying drawings.

DESCRIPTION OF THE PREFERRED EMBODIMENTS

Embodiments of the present invention will be described, with reference to the accompanying drawings.

First Embodiment

Figure 1A:
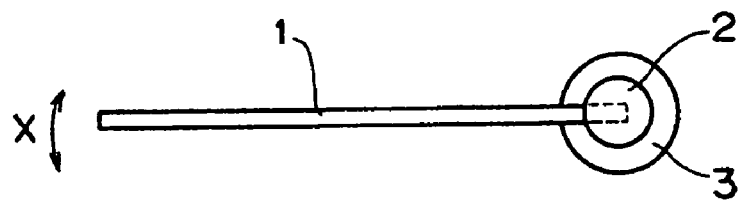
FIGS. 1A and 1B are schematic representations of the basic structure of an actuator according to the present invention.
Figure 1B:
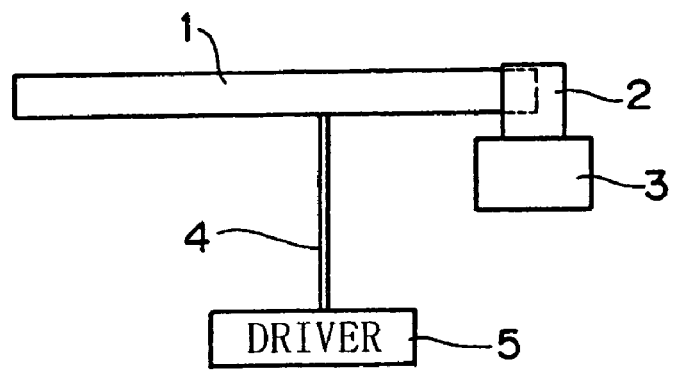

As shown in FIGS. 1A and 1B, the actuator according to the present invention comprises a drive body 1, a shaft (shaft member) 2, and a bearing section 3. The drive body 1 is shaped like a flat plate. The shaft 2 holds the drive body 1. The bearing section 3 supports the shaft 2. The drive body 1 is a bimorph piezoelectric element that is an electromechanical transducer. A driver 5 applies a voltage to the drive body 1 through a wire 4. When applied with the voltage, the drive body 1 bends around its proximal end that is coupled to the shaft 2. The distal end of the drive member 1 therefore moves in the direction of arrow X. The bearing section 3 supports the shaft 2, allowing the shaft 2 to rotate. A force that suppresses the rotation is imparted to the shaft 2. The rotation-suppressing force is imparted in the form of, for example, a frictional force. The frictional force is generated by a leaf spring 13 in the actuator of FIG. 2.

Figure 2:
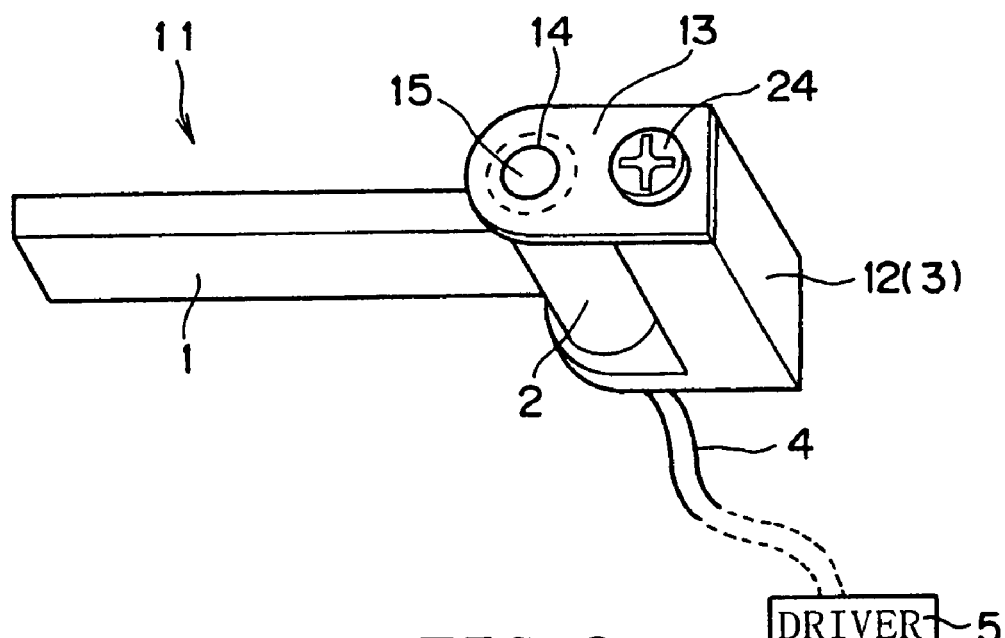
FIG. 2 is a perspective view of a rotary actuator according to an embodiment of this invention.

In the actuator 11 shown in FIG. 2, the shaft 2 that holds the drive body 1 is secured to a holder 12. The holder 12 performs the function of the bearing section 3 shown in FIGS. 1A and 1B. That is, it supports the shaft 2, allowing the shaft 2 to rotate. In the actuator 11, the drive body 1 is a piezoelectric element that is 20 mm long and 3 mm high, and the shaft 2 has a diameter of 4 mm.

The holder 12 holds a leaf spring (resistance member) 13 at the upper end. The leaf spring 13 applies a frictional force to the top (end) of the shaft 2, thus exerting a rotation-suppressing force. As will be specified later, the rotation-suppressing force applied to the shaft 2 is essential to the operation of this actuator 11. In other words, how to generate a stable rotation-suppressing force is important. To generate the rotation-suppressing force, a screw may be set in contact with the shaft. In this case, the screw may be rotated to adjust the rotation-suppressing force. This method using a screw can adjust the force, but an adjustable range is small in amount, thus failing to give a stable rotation-suppressing force. In the actuator 11, the leaf spring 13 exerts a rotation-suppressing force on the shaft 2. The leaf spring 13 generates an appropriate and stable load on the shaft 2. That is, the rotation-suppressing force is stable.

A setscrew 24 fastens the leaf spring 13 to the holder 12. The leaf spring 13 has an engagement hole 14 in the tip. A small-diameter portion 15 formed at the upper end portion of the shaft 2 is held in the hole 14. The stepped part of the shaft 2, defined at the upper end thereof, abuts on the lower surface of the leaf spring 13 resiliently. The leaf spring 13 therefore applies the rotation-suppressing force to the shaft 2. Thus, a simple and compact mechanism can keep exerting a stable load on the shaft 2, or applying a stable rotation-suppressing force to the shaft 2.

The shaft 2 and the bearing section 3 cooperate to impart a rotation-suppressing force in the actuator 11. The shaft 2 and the section 3 are indispensable components. They can constitute a structure for generating a rotation-suppressing force, without requiring other components specialized in suppressing the rotation. Since this structure is provided at the shaft 2, it can be sealed and free of dust when the actuator is applied to, for example, a wiper. This can stabilize the coefficient of friction between the shaft 2 and the leaf spring 13, whereby the rotation-suppressing force is stable.

Figure 3:
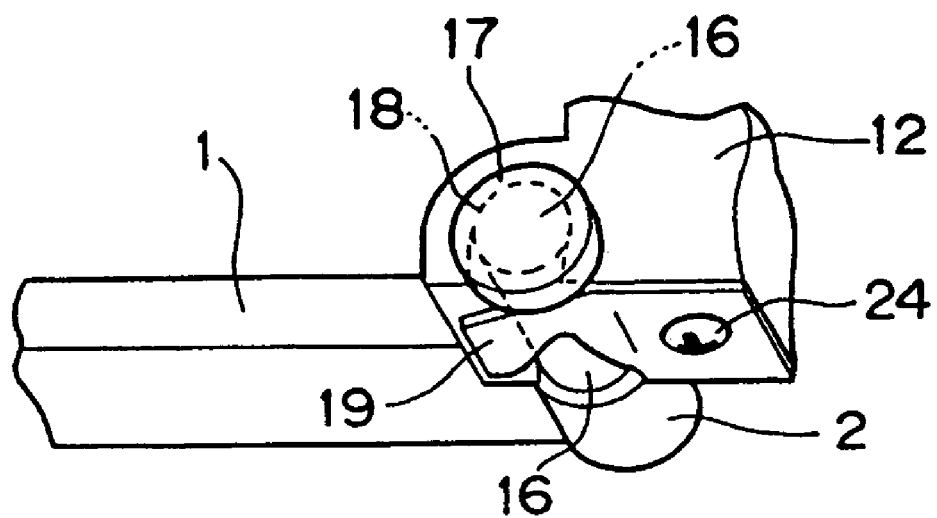
FIG. 3 is a perspective view illustrating a structure for imparting a force that suppresses the rotation of the actuator shown in FIG. 2.

The leaf spring 13 may be set in a resilient contact with the side of the shaft 2 as is illustrated in FIG. 3. More precisely, the shaft 2 has a small-diameter portion 16 and a flange 17 and the holder 12 has a recess 18. The flange 17 is placed on the upper surface of the holder 12, with the small-diameter portion 16 loosely set in the recess 18. Further, a leaf spring 19 is arranged, covering the opening of the recess 18 and set in a resilient contact with the small-diameter portion 16, whereby a rotation-suppressing force is applied to the shaft 2.

Figure 4:
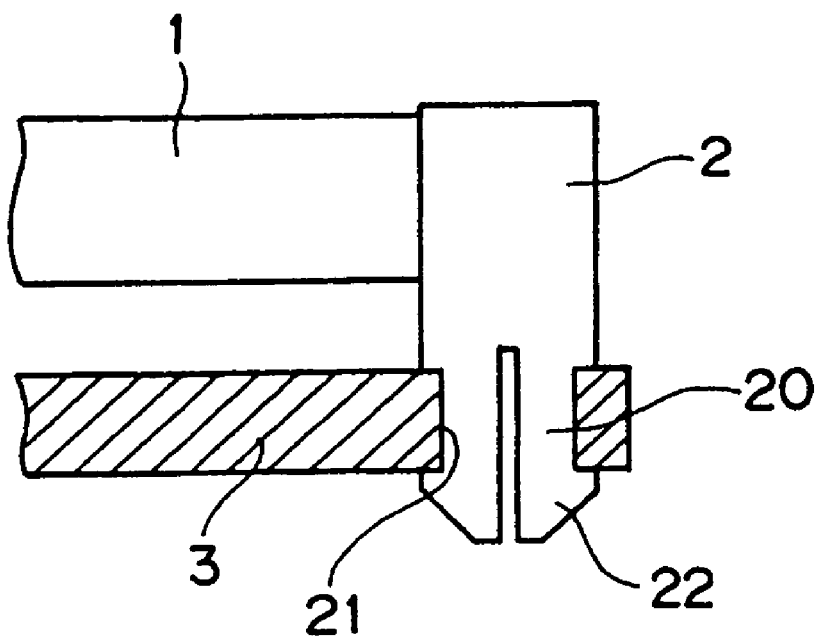
FIG. 4 is a side view showing another structure for imparting a resistance to the rotation of the actuator shown in FIG. 2.

The means of applying the rotation-suppressing force may be arranged on the shaft 2, not on the bearing section 3 as has been described above. As FIG. 4 shows, clip-shaped engagement strips 20 may be provided at the tip of the shaft 2. The engagement strips 20 are fitted in the engagement hole 21 made in the bearing section 3 to obtain frictional force. That is, the tip of the shaft 2 is split into four resilient strips 20, which are bent and inserted into the engagement hole 21. The tips of the strips 20 protrude from the lower end of the engagement hole 21 and are set in resilient contact with the lower surface of the bearing section 3. The strips 20 return resiliently and the outer circumferences thereof also resiliently contact the surface of the engagement hole 21. Friction is thereby generated between the strips 20 and the engagement hole 21. Thus, a rotation-suppressing force is applied to the shaft 2.

Figure 5:
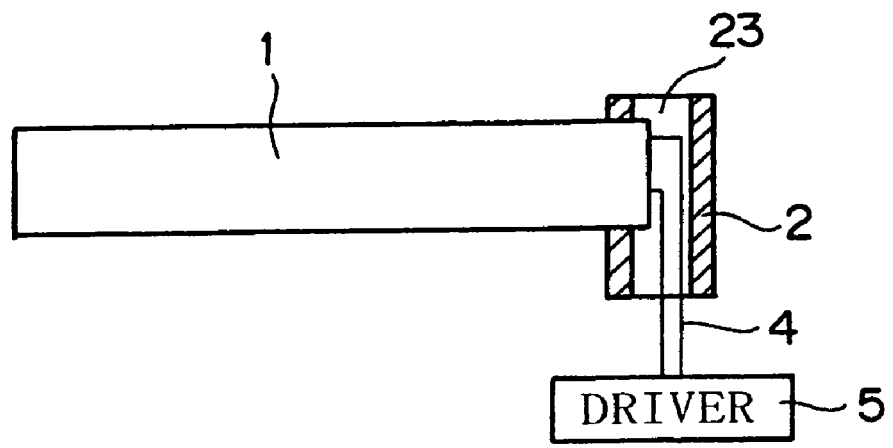
FIG. 5 is a side view for explaining a power-supplying system used in the actuator of FIG. 2.

FIG. 5 is a side view for explaining the power-supplying system used in the actuator illustrated in FIG. 2. The shaft 2 of the actuator 11 is a hollow shaft having an axial hole 23. As FIG. 5 shows, a wire 4 extends through the hole 23, for supplying electric power to the drive body 1. In the actuator 11, the wire is not provided outside the drive body 1. Rather, the wire 4 is incorporated in the device. Therefore, the wire 4 is not wound around the drive body 1 as the drive body 1 is rotated, though it is slightly twisted. The wire 4 is not damaged. The wire 4 can be smoothly guided into the interior of the device. In addition, the electrical system can be waterproof because the wire 4 is not exposed.

Figure 6:
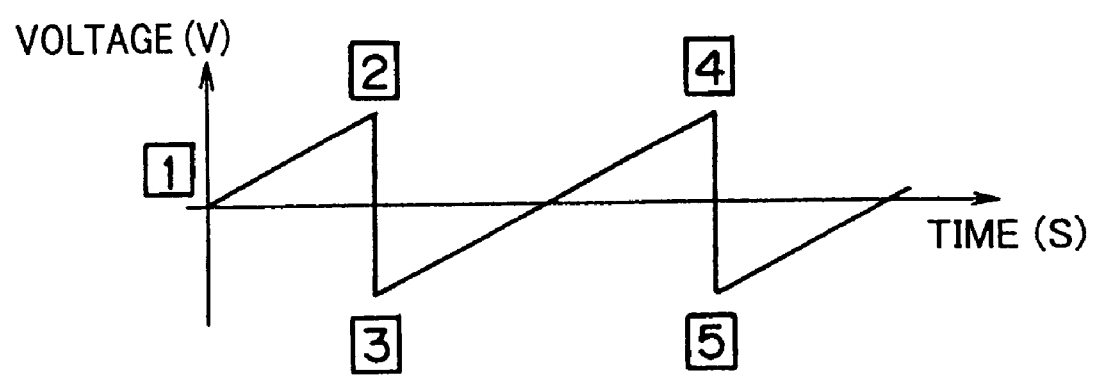
FIG. 6 is a diagram showing the waveform of a voltage applied to the actuator illustrated in FIG. 2.
Figure 7:
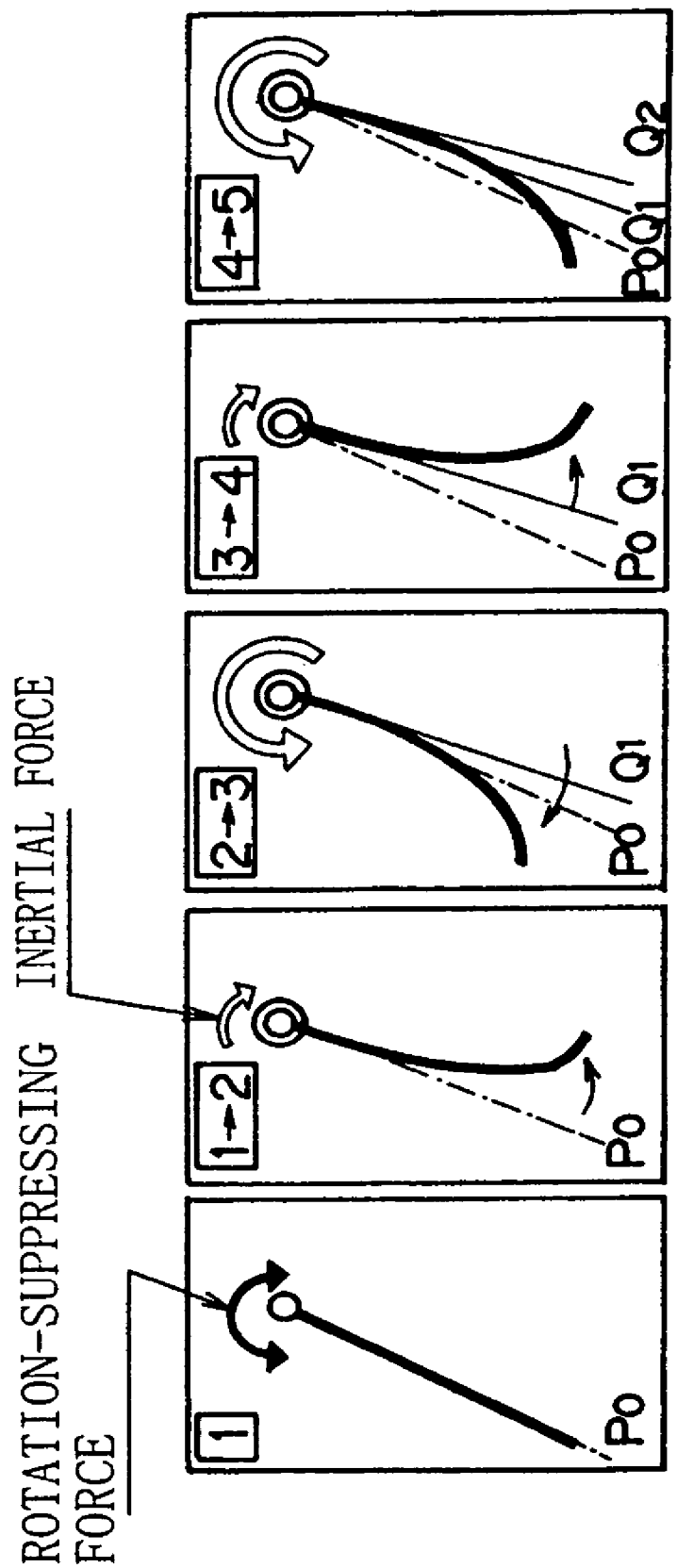
FIG. 7 is a diagram illustrating how a drive body operates in the actuator when the voltage shown in FIG. 6 is applied to the actuator.

The actuator 11 may be applied with a voltage having a sawtooth waveform as shown in FIG. 6. When driven by the voltage, the actuator 11 rotates around the axis of the shaft 2. FIG. 6 is a diagram showing the waveform of the voltage applied to the actuator. FIG. 7 is a diagram illustrating how the drive body 1 operates in the actuator when the voltage shown in FIG. 6 is applied to the actuator. The drive body 1 rotates to the right in FIG. 7 when the voltage is in the positive phase (+) and to the left when the voltage is in the negative phase (−).

The voltage applied to the actuator changes as illustrated in FIG. 6. When the voltage is at value 1, or ±0, the drive body 1 is at the neutral position $P_0$. When the voltage rises to a positive value 2, the drive body 1 rotates to the right as shown in FIG. 7 (1→2). When the voltage then falls to a negative value 3, the drive body 1 rotates to the left as indicated in FIG. 7 (2→3).

Since the voltage rapidly changes (2→3), the deforming speed of the drive body 1 when the voltage falls (2→3) is different from that of when the voltage rises slowly as (1→2). In other words, the drive body 1 slowly bends every time the voltage rises (1→2) and quickly bends every time the voltage falls (2→3). Hence, the drive body 1 acquires an inertial force, the force when the voltage falls (2→3) is greater than that of when the voltage rises (1→2) because of the difference in the deforming speed of the drive body 1.

The rotation-suppressing force applied to the shaft 2 acts on the inertial force. The inertial force and the frictional force act against each other as the drive body 1 is deformed. In the actuator 11, the rotation-suppressing force Fr is set to be larger than the inertial force $F_{12}$ when the voltage rises (1→2) and smaller than the inertial force $F_{23}$ when the voltage falls (2→3). That is, $F_{12}<Fr<F_{23}$. Hence, the rotation-suppressing force Fr cancels out the inertial force $F_{12}$ generated when the voltage rises (1→2), whereby the drive body 1 slowly rotates by the angle corresponding to the voltage. By contrast, the rotation-suppressing force Fr does not cancel out the inertial force $F_{23}$ generated when the voltage falls (2→3). In this case, the drive body 1 rapidly rotates in the opposite direction as the voltage changes, but cannot rotate by such a large angle corresponding to the voltage and cannot return to the initial position.

That is, when the voltage falls (2→3), the inertia of the drive body 1 acts more than when the voltage rises, and the drive body 1 rotates less to the left than it rotates to the right when the voltage rises (1→2). The drive body 1 therefore rotates to the right by a difference between the leftward rotation angle and the rightward rotation angle. In FIG. 7, line Q indicates the axis of the drive body 1 that has rotated to the right and then to the left. As seen from the cases (2→3) and (4→5), line Q rotates to the right as the drive body 1 rotates to the right ($Q_1$→$Q_2$). Dotted, dashed line $P_0$ shown in FIG. 7 represents the position (i.e., initial position) that the drive body 1 takes in the case 1 shown in FIG. 7.

As FIG. 6 shows, the voltage of sawtooth waveform gradually rises from value 3 to value 4 after it sharply falls from value 2 to value 3. As a result, the drive body 1 rotates to the right as is illustrated in FIG. 7 (3→4). In this case, the voltage rises at a low rate and the inertia of the drive body 1 works is small. The drive body 1 rotates to the right by an angle that corresponds to the voltage. When the voltage reaches value 4 (FIG. 6), it rapidly falls again to value 5. At this time, too, an inertial force is generated from the difference in the deforming speed of the drive body 1. The angle by which the drive body 1 rotates to the left as the voltage changes from value 4 to value 5 (FIG. 7) is smaller than the angle by which the drive body 1 rotates to the right as the voltage changes from value 3 to value 4 (FIG. 7). Hence, the drive body 1 rotates to the right by the difference in angle, and line Q also rotates to the right.

When the voltage of sawtooth-waveform is applied, the drive body 1 gradually rotates to the right as shown in FIG. 7, due to the inertial force generated from the difference in the deforming speed of the drive body 1. Thus, the drive body 1 rotates counterclockwise (see the motion of line Q). Namely, the drive body 1 is slowly bent and quickly straightened, repeatedly. The drive body 1 self-rotates in the direction in which it is slowly bent. If the voltage gradually falls and quickly rises, in the mode opposite to the mode shown in FIG. 6, the drive body 1 rotates clockwise as is illustrated in FIG. 7. Thus, the drive body 1 can be moved back and forth by switching the mode of changing the voltage. The actuator can therefore oscillate without having a motor or a link mechanism.

The actuator 11 is simple in structure. Nonetheless, the drive body 1 can be rotated in the actuator 11. Neither an electromagnetic motor nor a link mechanism is required to drive the drive body 1. The actuator rotating a rod-shaped member can be small and light. Having no motor and no link, the actuator can be laid out anywhere. The actuator that rotates any component can be installed in a small space.

Second Embodiment

Figure 8:
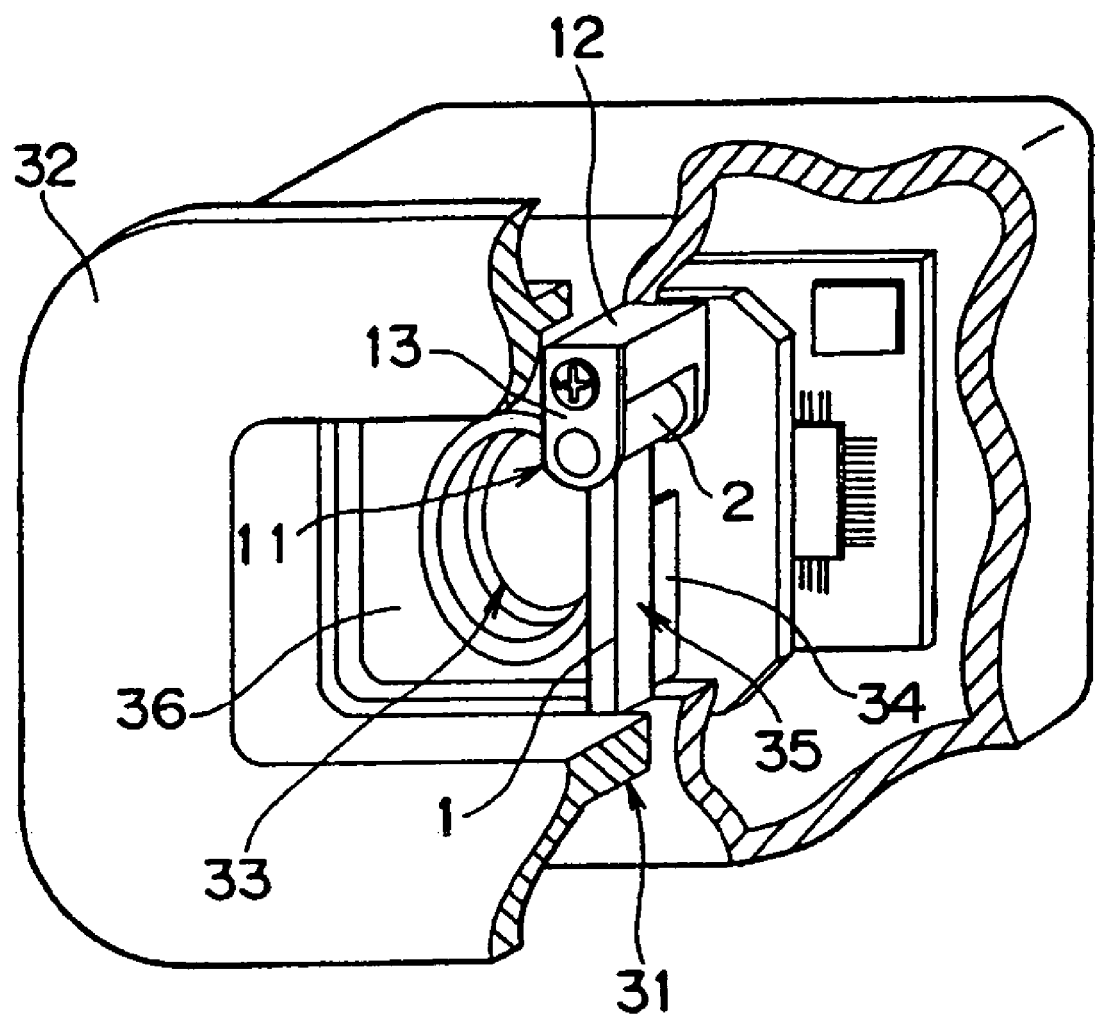
FIG. 8 is a partly cutaway, perspective view of a wiper, or a second embodiment of the invention, which incorporates the actuator illustrated in FIG. 2.

The second embodiment of this invention will be described. The second embodiment is a wiper for use on CCD cameras, which incorporates the actuator 11 shown in FIG. 2. FIG. 8 is a partly cutaway, perspective view of the wiper 31. Hereinafter, the mutually corresponding members, parts, etc. in the first embodiment are designated by the same reference numerals and a detailed description is omitted for simplicity.

Recently, CCD cameras have found use in cars so that the drivers may see other cars and pedestrians approaching at blind crossroads or T-roads, without necessity of driving the cars deep into the crossroads or T-roads. In such a car, some CCD cameras are secured to the side bumpers or provided behind the front grills, respectively. The display provided in the car displays the left and right images that the CCD cameras have output. When it rains, however, rain drops stick to the front pane of either CCD camera. Consequently, the images generated by the CCD cameras do not provide adequate view fields. To give a sufficiently large view field to the camera, a wiper may be attached to the front of either CCD camera. In the past this could not be achieved, however, because a conventional wiper has a motor for driving the wiper blade and is inevitably too large to be attached to the front of a CCD camera, which is small.

The wiper 31 according to the invention, which incorporates an actuator, needs no motor whatsoever, and the wiper can be small enough to be used with the CCD camera. As seen from FIG. 8, the wiper 31 comprises a cover 32 and the actuator 11 of FIG. 2, which is secured to the cover 32. The wiper 31 can be attached to the front of a CCD camera 33 as a wiper unit integrated with the cover 32. The wiper 31 can be set in the front of the CCD camera 33 without additional work to the body thereof.

A rubber blade 34 is fastened to the drive body 1 of the actuator 11 and functions as wiper blade 35. The wiper blade 35 can oscillate around the shaft 2, on the glass surface 36 (wipe surface) of the CCD camera 33. When the driver (not shown) applies a voltage to the drive body 1, the wiper blade 35 oscillates on the glass surface 36, removing raindrops and dust from the surface 36.

The wiper 31 need not comprise an electromagnetic motor or a link mechanism to drive the blade. It can therefore be small and light. Since the motor and the link do not restrict a blade position, the apparatus layout can be improved and the wiper can be provided in a narrow and small space. It can be attached to not only CCD cameras for cars, but also any devices and positions which are relatively small and which have not hitherto been provided with wipers.

The wiper 31 incorporates the actuator 11 illustrated in FIG. 2. Nonetheless, it may have an actuator of the structure shown in FIG. 3. If the rubber blade 34 generates a rotation-suppressing force, the wiper 31 need not comprise the leaf spring 13.

Third Embodiment

Figure 9A:
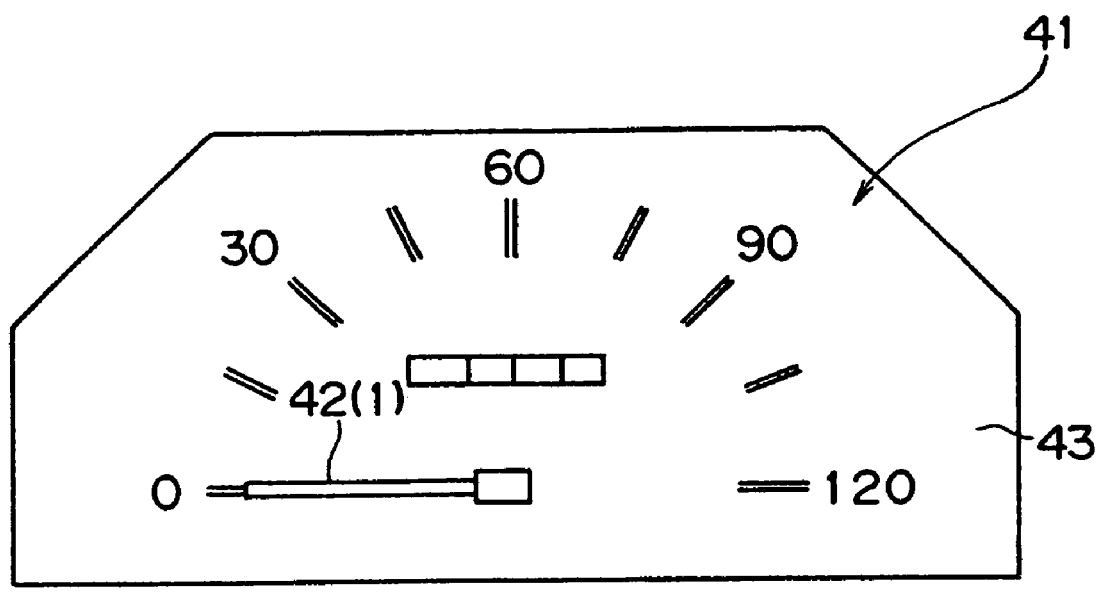
FIG. 9A is a front view of a speedometer, or a third embodiment of the invention, which comprises the actuator of FIG. 2.
Figure 9B:
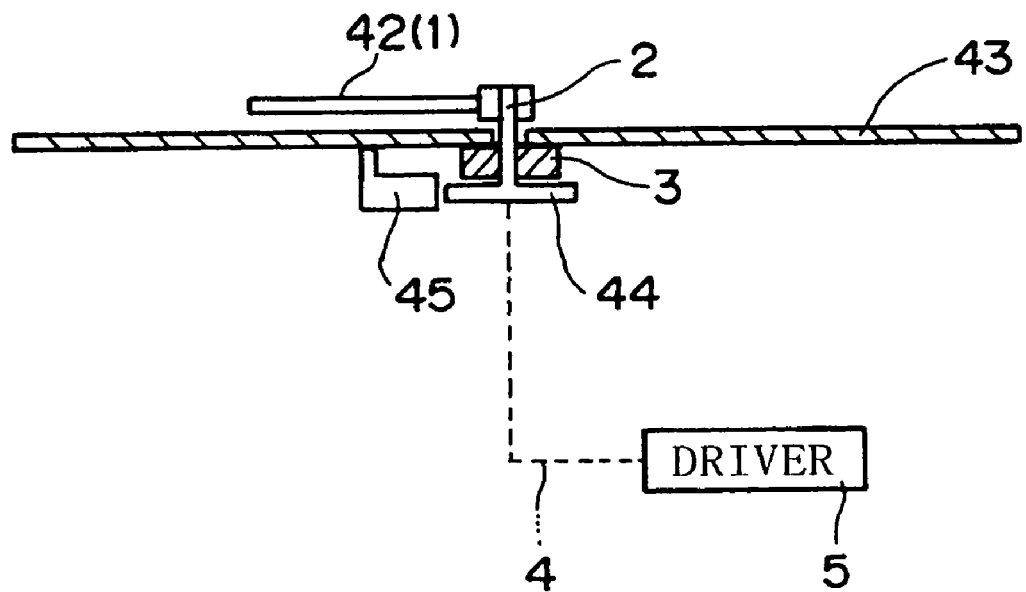
FIG. 9B is a sectional view of the speedometer, showing a pointer of the speedometer.

The third embodiment of the present invention will be described. The third embodiment is a speedometer that incorporates the actuator II shown in FIG. 2. FIGS. 9A and 9B show the speedometer 41. FIG. 9A is a front view, and FIG. 9B is a sectional view of the speedometer, showing a pointer of the speedometer.

As illustrated in FIGS. 9A and 9B, the drive body 1 of the actuator 11 is used as the pointer 42 of the speedometer 41. That is, the pointer 42 is made of a piezoelectric element.

The pointer 42 is fixed to the shaft 2 that protrudes from the meter panel 43 of the speedometer 41. The bearing section 3 of the actuator 11, which is shaped like a ring, is provided on the back of the meter panel 43. The bearing section 3 supports the shaft 2, allowing the same to rotate. The shaft 2 has been slightly pressed into the bearing section 3, so that the section 3 may apply a rotation-suppressing force to the shaft 2. In this embodiment, the bearing section 3 works as a friction member.

A sensor disk 44 is fastened to the lower end of the shaft 2. The sensor disk 44 has a plurality of magnetic poles that are arranged in the circumferential direction of the disk 44. A rotation sensor 45 (sensor for detecting the position of the pointer) is located near the sensor disk 44. The rotation sensor 45 detects the position to which the pointer 42 rotates when electric power is supplied to the drive body 1. More precisely, the rotation sensor 45 detects the change of the magnetic poles as the sensor plate 44 rotates, to thereby measure the angle through which the sensor disk 44 rotates.

When the driver 5 applies the voltage that corresponds to the speed of the car to the drive body 1, the pointer 42 rotates around the shaft 2 over the panel 43. The rotation sensor 45 detects the rotation angle of the pointer 42, and the drive body 1 is controlled based on the detected angle to move the pointer 42 to the right position.

The pointer drive mechanism can be provided in the space accommodating the pointer in the speedometer 41. Further, no electromagnetic motor needs to be used to drive the pointer 42. The speedometer 41 can be small and light. The speedometer 41 therefore has an increased freedom of layout. The pointer 42 can be secured to the shaft 2, merely by being mounted on the shaft 2 protruded from the panel 43. This enhances the efficiency of assembly of the speedometer 41. The shaft 2 may be of the type illustrated in FIG. 4. In this case, the shaft 2 may only be inserted into the bearing section 3 fixed to the back of the meter panel 43.

Instead of the pointer 42 being the drive body 1, a pointer made of synthetic resin or metal may be secured to the drive body 1. The structure of the third embodiment can be applied to meters other than a speedometer and a clock that have pointers. When the driver 5 stops applying the voltage to the drive body 1, the pointer 42 is held in position, due to the rotation-suppressing force. In view of this, the third embodiment is desirable as a meter that is designed to measure a physical amount that changes very little or as a meter whose pointer can be stopped whenever desired. To measure the speed, the speedometer 41 does not need electric power at all times, which saves power.

Fourth Embodiment

Figure 10:
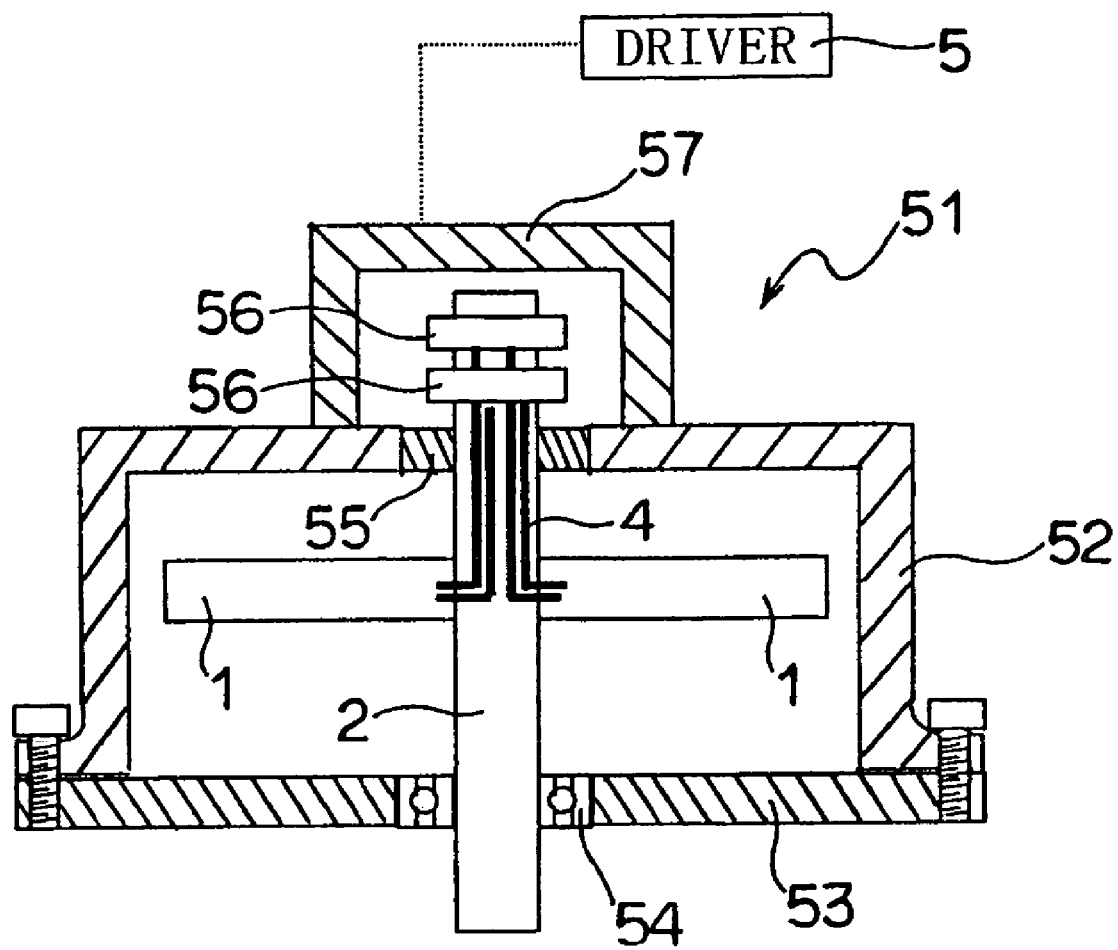
FIG. 10 is a sectional view of a motor, or a fourth embodiment of the invention, to which the actuator of FIG. 2 is applied.

The fourth embodiment of this invention will be described. The fourth embodiment is a motor that incorporates the actuator 11 shown in FIG. 2. FIG. 10 shows the motor 51. The actuator 11 can not only swing a wiper, but also work as a rotary machine, and it can form the motor 51 shown in FIG. 10.

In the motor 51, two drive bodies 1 are mounted on the shaft 2. Both drive bodies 1 are provided in a housing 52 that is placed on a base plate 53. A ball bearing 54 (bearing section) is fitted in the base plate 53. A metal bearing 55 is fitted in the top wall of the housing 52. The bearings 54 and 55 support the shaft 2, allowing the shaft 2 to rotate. The shaft 2 is slightly pressed into the metal bearing 55. Therefore, the metal bearing 55 applies a rotation-suppressing force to the shaft 2.

The shaft 2 is a hollow one. A wire 4 extends through the hole 23, for supplying electric power to the drive body 1. The wire 4 is connected to slip rings 56 that are mounted on the upper end portion of the shaft 2. The slip rings 56 are contained in a case 57 that is mounted on the top of the housing 52. The driver 5 applies a voltage to the drive bodies 1 through the slip rings 56.

When the driver 5 applies a voltage of a sawtooth waveform to the motor 51, the drive bodies 1 move as shown in FIG. 7 and rotate the shaft 2 in any direction desired. The output torque of the shaft 2 can be controlled by changing the voltage applied to the drive bodies 1. Further, the speed of the shaft 2 (number of rotations per unit time) can be adjusted by changing the frequency of the sawtooth voltage. Furthermore, the output torque can be controlled by changing the number of drive bodies 1. For example, the slip ring 56 is provided for each drive body 1, and the number of drive bodies 1 with voltage applied thereto may be changed, to thereby change the output of the motor 51.

In the motor 51, the drive bodies 1 are bimorph piezoelectric elements and drive the shaft 2. The section that imparts a drive force to the shaft 2 can be of a small weight. The motor 51 can therefore be small and light, can have small inertia, and can yet respond well to the input power.

The number of drive bodies 1 used is not limited to two. The motor 51 may have only one drive body. Alternatively, the motor 51 may have three or more drive bodies to increase its output. The means for generating a rotation-suppressing force may be a leaf spring or a rubber plate set in sliding contact with the shaft 2. The slip rings 56 may be replaced by any other components that can supply power to the drive bodies 1. They may be replaced by, for example, commutators.

Fifth Embodiment

Figure 11A:
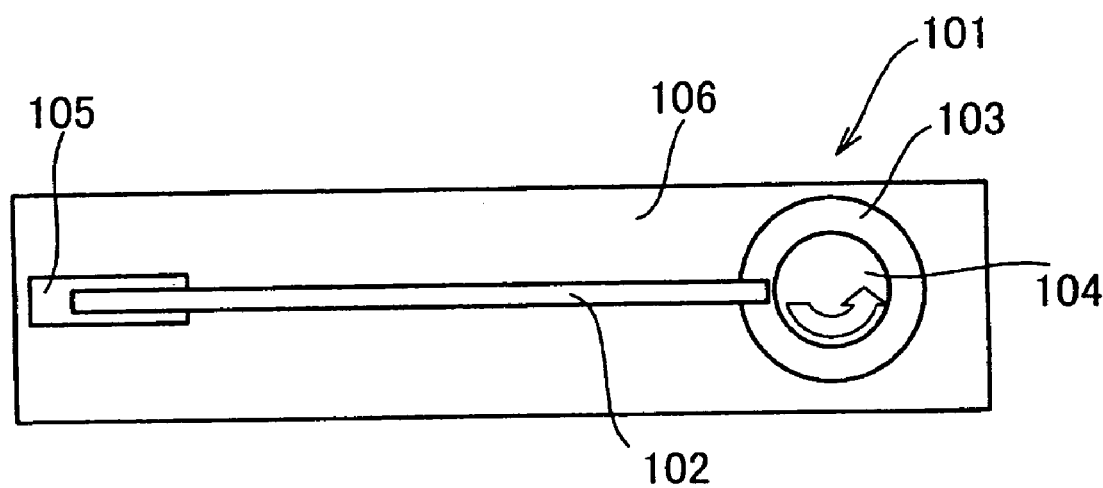
FIG. 11A is a plan view of a rotary actuator that is a fifth embodiment of the invention.
Figure 11B:
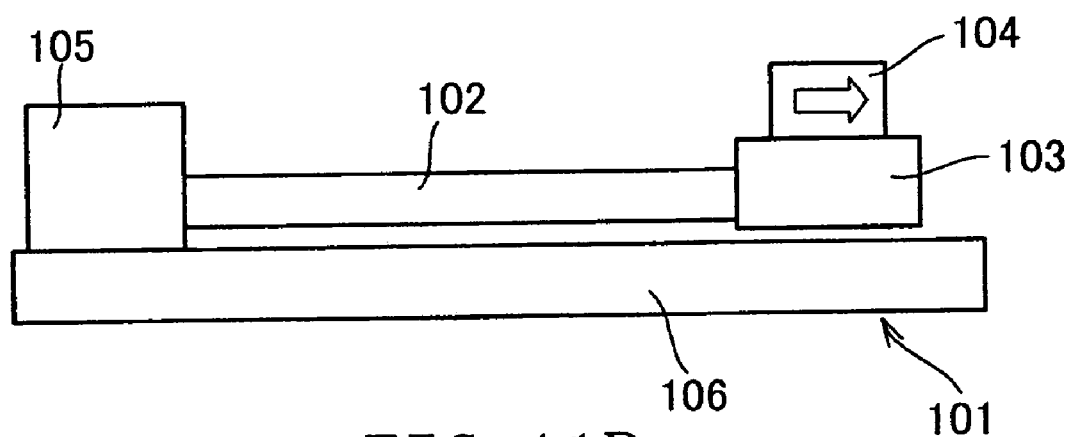
FIG. 11B is a front view of the rotary actuator shown in FIG. 11A.
Figure 12:
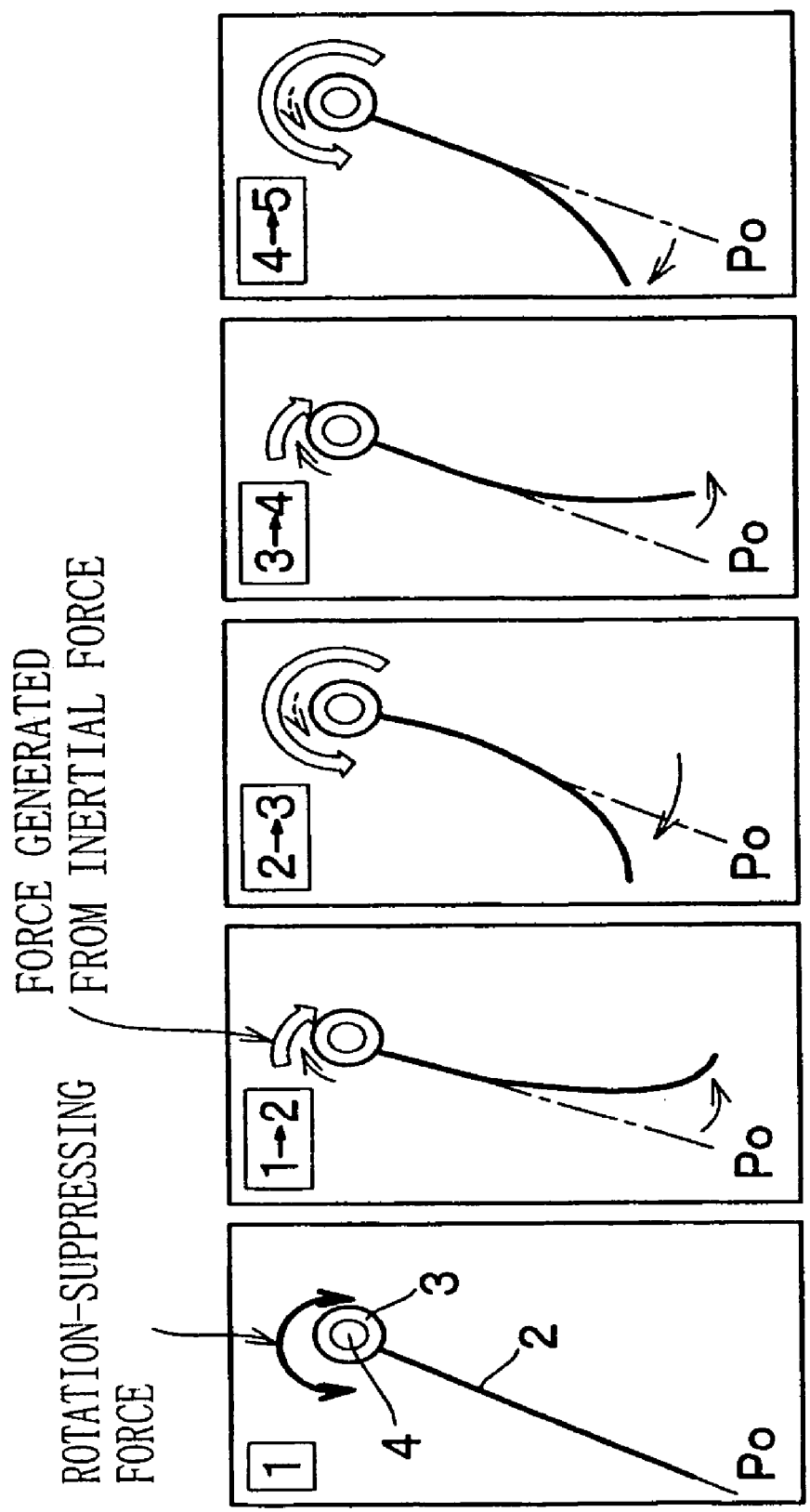
FIG. 12 is a diagram explaining how the rotary actuator operates when the voltage shown in FIG. 6 is applied to the rotary actuator.

The fifth embodiment of the invention will be described. The fifth embodiment is a rotary actuator in which the free end of a drive body is loosely held and the shaft secured to the fixed end of the drive body is rotated. FIGS. 11A and 11B show the rotary actuator 101, i.e., the fifth embodiment of the invention. FIG. 11A is a plan view, and FIG. 11B a front view. FIG. 12 is a diagram explaining how the rotary actuator 101 operates.

As FIGS. 11A and 11B show, the actuator 101 comprises a drive body 102, a bearing section (first shaft member) 103, a shaft (second shaft member) 104, and a support section 105. The drive body 102 is shaped like a plate; it is a bimorph piezoelectric element as in the first embodiment. The bearing section 103 holds the proximal end of the drive body 102. The shaft 104 is secured to the bearing section 103. The support section 105 supports the drive body 102. A driver applies a voltage to the drive body 102 through a wire (not shown). When the voltage is applied to the drive body 102, the drive body 102 is bent, in its entirety except the proximal end, around the bearing section 103, and its distal end portion acts in the same way as in the first embodiment.

A force is exerted on the shaft 104 to suppress the rotation of the shaft 104. More specifically, the shaft 104 has clip-shaped engagement strips of the type shown in FIG. 4. The engagement strips are fitted in the hole made in the bearing section 103. A friction develops between the strips and the hole. The friction suppresses the rotation of the shaft 104.

The drive body 102 has its proximal end held by the support section 105 that is mounted on a base 106. The support section 105 is made of elastic material such as rubber or foamed plastic. It supports one end of the drive body 102 such that the drive body 102 and the bearing section 103 can vibrate but will not touch the base 106 located below the drive body 102 and the bearing section 103. The drive body 102 can move up and down (FIG. 11A) in the support section 105.

The actuator 101 may be applied with a voltage having such a sawtooth waveform as shown in FIG. 6. When driven by the voltage, the actuator 101 rotates around the axis of the shaft 104. As shown in FIG. 12, the drive body 102 rotates to the right when the voltage is in the positive phase (+) and to the left when the voltage is in the negative phase (−). More precisely, the drive body 102 is at the initial position $P_0$ when the voltage has value 1 in FIG. 6, or 0 volt. When the voltage rises to value 2, a positive value, as shown in FIG. 6, the drive body 102 moves to the right (112, in FIG. 12). Then, when the voltage falls from value 2 to value 3, a negative value, as shown in FIG. 6, the drive body 102 moves to the left (2→3, in FIG. 12). In FIG. 12, the support section 105 holding the distal end of the drive body 102 is not shown, in order to clearly demonstrate the motion of the drive body 102. In the support section 105, actual displacement of the drive body 102 is only 0.1 mm or less. The body 102 repeatedly moves in the support section 105.

As indicated earlier, the drive body 102 is deformed at a rate while moving to the right (1→2, in FIG. 12), and at a different rate while moving to the left (2→3, in FIG. 12). The drive body 102 has an inertial force due to its weight and tends to remain where it is located. The inertial force the body 102 has while moving to the left (2→3) is greater than the inertial force it has while moving to the right (1→2), due to the difference in terms of the deforming speed of the drive body 102. A reaction to the inertial force is generated at the bearing section 103. The reaction, i.e., a force for rotating the body 102, is greater while the body 102 is moving to the left (2→3) than while the body 102 is moving to the right (1→2).

The rotation-suppressing force Fr, i.e., the friction between the bearing section 103 and the shaft 104, acts against the force for rotating the drive body 102. The force Fr is larger than the shaft-rotating force $F_{12}$ acting while the body 102 is moving to the right (1→2) and is smaller than shaft-rotating force $F_{23}$ acting while the body 102 is moving to the left (2→3). Thus, $F_{12}<Fr<F_{23}$. While the body 102 is moving to the right (1→2), the bearing section 103 and the shaft 104 rotate clockwise together, with virtually no slipping between them, because force $F_{12}$ acting clockwise is smaller than the rotation-suppressing force Fr. While the body 102 is moving to the left (2→3), the bearing section 103 and the shaft 104 slip on each other because force $F_{23}$ is larger than the rotation-suppressing force Fr. In this case, the shaft 104 can hardly rotate counterclockwise. Therefore, the drive body 102 remains deformed in the direction it has rotated (1→2), and the shaft 104 rotates clockwise. Note that the body 102 rotates in the direction opposite to the direction it rotates as shown in FIG. 7. This is because the bearing supporting the drive body 102 rotates, not the drive body as in the case shown in FIG. 7.

The voltage of sawtooth waveform rapidly falls from value 2 to value 3 as shown in FIG. 6. It then gradually rises from value 3 to value 4, i.e., a positive value. The drive body 102 therefore moves to the right (3→4, in FIG. 12) as the voltage changes. As the body 102 moves so, a force is generated at the bearing section 103 to rotate the drive body 102, reacting to the inertial force exerted on the drive body 102. Nonetheless, the force for rotating the body 102 is small as in the case (1→2), since the voltage changes at a low rate. Hence, the shaft 104 rotates clockwise together with the bearing section 103 as the voltage changes.

After the voltage rises to value 4 (FIG. 6), it rapidly falls to value 5. In this case, too, the drive body 102 acquires an inertial force due to the difference in the deforming speed of the drive body 102. A reaction to the inertial force is generated, acting as a large force for rotating the drive body 102. Therefore, the bearing section 103 and the shaft 104 slip on each other as in the case (2→3), and the shaft 104 scarcely rotates counterclockwise. In other words, the shaft 104 does not rotate counterclockwise as indicated by broken lines in the cases (2→3) and (4→5), though it rotates clockwise as indicated by solid lines in the cases (1→2) and (3→4). After all, the shaft 104 rotates clockwise as the voltage changes from value 1 to value 5.

When the voltage of sawtooth waveform is applied to the drive body 102, the shaft 104 gradually rotates clockwise as shown in FIG. 12, due to the inertial force generated from the difference in the deforming speed of the drive body 102. In this case, too, the shaft 104 can be rotated in the forward direction or the reverse direction by switching the pattern of changing the voltage. The number of times the shaft 104 rotates per unit time can be controlled by changing the frequency of the sawtooth-waveform voltage. Further, the torque of the shaft 104 can be controlled by changing the voltage.

The actuator 101 is composed of four components (i.e., drive body 102, bearing section 103, shaft 104 and support section 105). It is simple in structure. The shaft 104 can yet be driven at a low speed and a high torque. Neither an electromagnetic motor nor a multi-phase, high-frequency power supply is required to drive the shaft 104. The actuator 101 can, therefore, be a small, light and inexpensive rotary actuator. Since the actuator 101 is thin, it has a high freedom of layout. The actuator 101 can be laid out in a narrow and small space.

Sixth Embodiment

Figure 13:
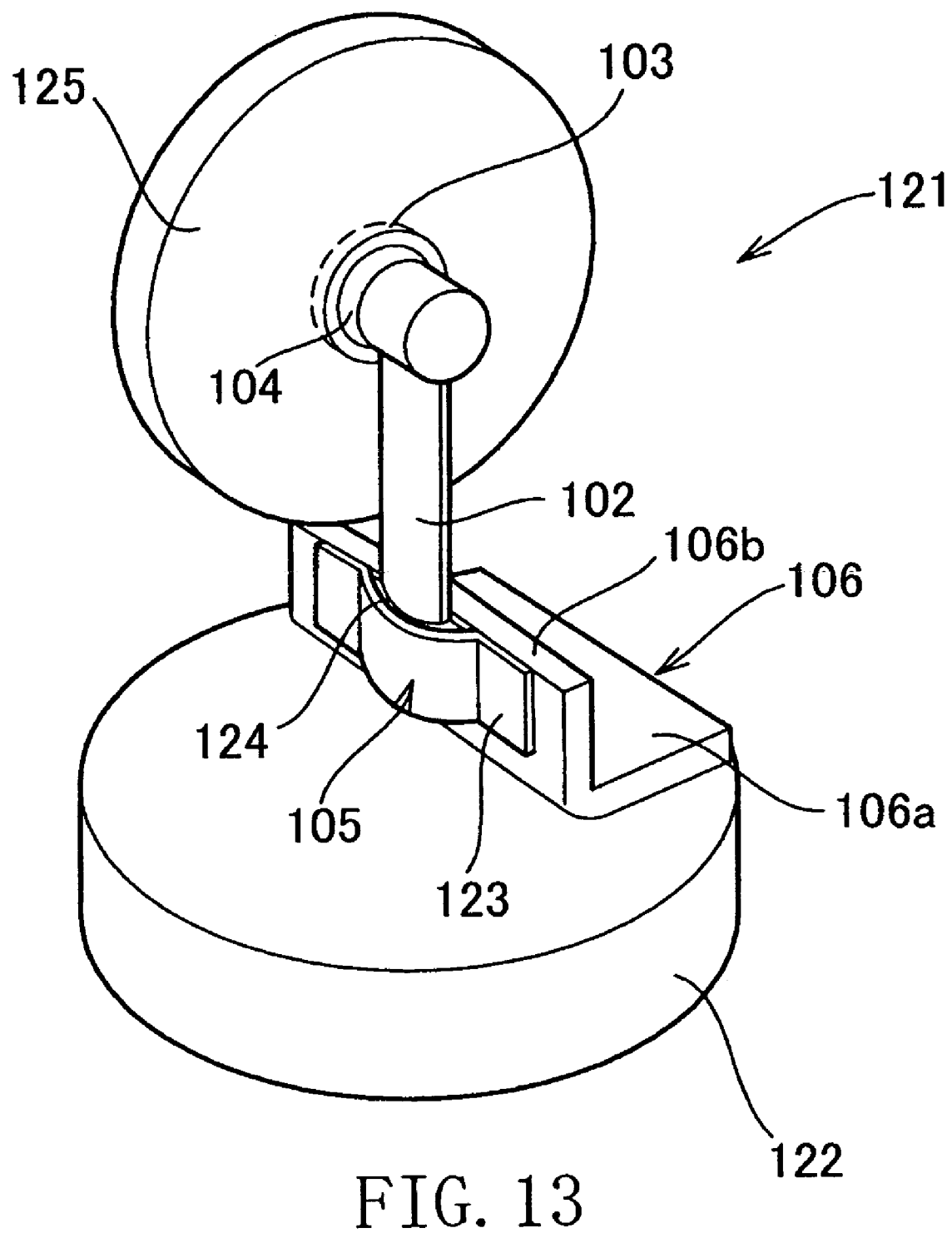
FIG. 13 is a perspective view of a rotary actuator that is a sixth embodiment of the present invention.

The sixth embodiment of the invention will be described. The sixth embodiment is a rotary actuator. FIG. 13 is a perspective view of the rotary actuator. The mutually corresponding members, parts, etc. in the fifth embodiment are designated by the same reference numerals and will not be described.

In an actuator 121 of FIG. 13, a drive body 102 is arranged in the vertical direction. The drive body 102 is held by a support section 105 that is fastened to a bracket 106. The bracket 106 is a metal member that has an L-shaped cross section. Its horizontal part 106a is secured to the upper surface of a base 122. The vertical part 106b of the bracket 106 holds a holding plate 123. The inner side of the plate 123 is lined with a foamed plastic layer 124. The drive body 102 is secured to the support section 105, with its lower end held by the foamed plastic layer 124. The drive body 102 is adhered to the foamed plastic layer 124 with an adhesive tape or the like. Having its lower end held by the foamed plastic layer 124, the drive body 102 can vibrate, though it is fixed to the support section 105.

In the actuator 121, the shaft 104 is attached to the upper end of the drive body 102. A bearing section 103 is mounted on a shaft 104 and can rotate relative to the shaft 104. A disc 125 is secured to the bearing section 103. The shaft 104 and the bearing section 103 perform the same function as the first and second shafts of the fifth embodiment, respectively. That is, the shaft and the bearing section are interchangeable in position in the fifth and sixth embodiments. Whether the shaft 104 or the bearing section 103 is fastened to the drive body 102 and acts as the output-side part is nothing more than a design choice.

A rotation-suppressing force is applied to the bearing section 103. In the fifth embodiment, a rotation-suppressing force is exerted on the shaft 104. In the sixth embodiment, the force is exerted on the bearing section 103. Namely, whether the bearing section 103 or the shaft 104 receives the rotation-suppressing force depends on which component functions as the output-side part. In other words, a force is applied to suppress the relative rotation between the bearing section 103 and the shaft 104 in both the fifth embodiment and the sixth embodiment. The shaft 104 is made of phosphor bronze. It has clip-shaped engagement strips as in the fifth embodiment. The bearing section 103 is made of fluorocarbon resin and is set in elastic engagement with the engagement strips of the shaft 104. The friction between the engagement strips, on the one hand, and the bearing section 103, on the other, suppresses the rotation of the bearing section 103.

Such a sawtooth-waveform voltage as shown in FIG. 6 is applied to the actuator 121. The disc 125 fastened to the bearing section 103 rotates due to the relation between the rotation-sustaining force and the force on the shaft 104, which is a reaction to the inertial force that has been generated from a change in the voltage as described earlier. The disc 125 can be rotated in the forward direction and the reverse direction, by switching the mode of changing the voltage. In addition, the rotational speed of the disc 125 can be controlled by changing the frequency of the sawtooth-waveform voltage, and the rotation torque of the disc 125 can be controlled by changing the voltage.

Both actuators 101 and 121 can drive not only a driven member by the bearing section 103 directly as in the sixth embodiment, but also drive the blades of car wipers, the pointers of speedmeters, and the hands of clocks by securing a rod-shaped member to the bearing section 103 or the shaft 104.

Seventh Embodiment

Figure 14:
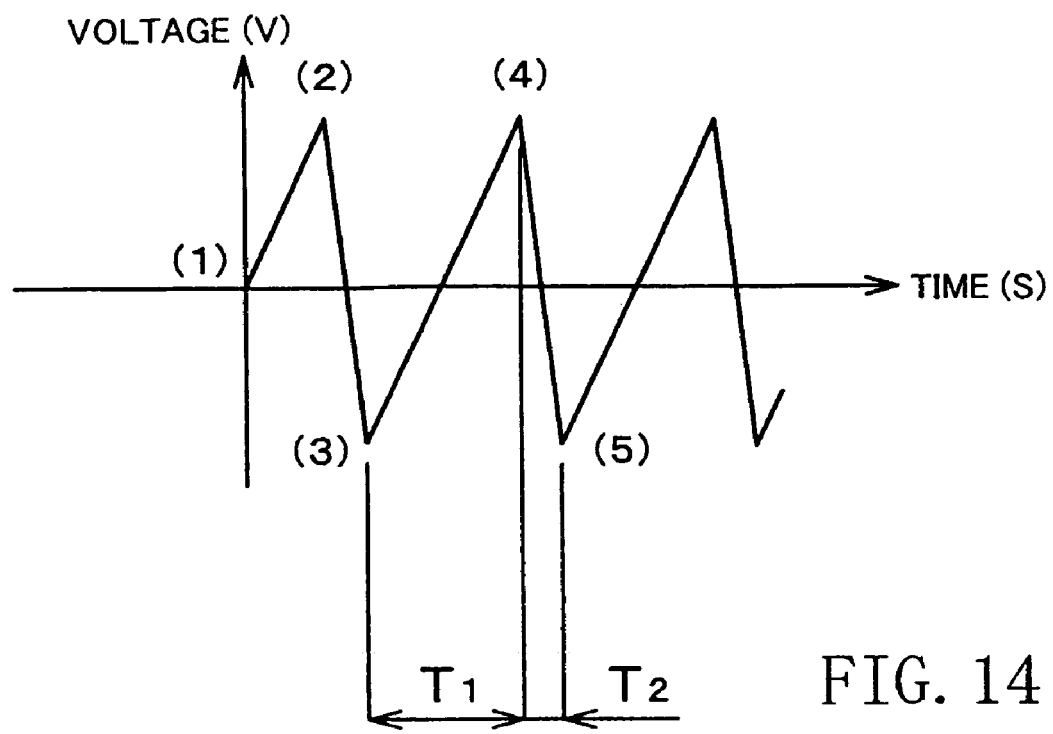
FIG. 14 is a diagram representing the waveform of a voltage applied in a method of controlling an actuator, which method is a seventh embodiment of this invention.

The seventh embodiment of this invention will be described. The seventh embodiment is a method of controlling the actuator 11 according to the first embodiment. FIG. 14 is a diagram representing the waveform of a voltage applied to the actuator 11.

If such a sawtooth-waveform voltage as illustrated in FIG. 6 is applied to the piezoelectric element, a problem will arise. A noise will be generated when the voltage applied rapidly falls from value 2 to value 3 or from value 4 to value 5 as is shown in FIG. 6. People near the actuator may recognize this noise as an annoying one. It is therefore important to minimize the noise.

In the seventh embodiment, a voltage having such a waveform as shown in FIG. 14 is applied to prevent a noise. As seen from FIG. 14, the voltage applied to the actuator 11 has a frequency of 250 Hz and changes between the maximum and minimum values that differ by 200V. The voltage rises from the minimum value to the maximum value over time $T_1$ and falls from the maximum value to the minimum value over time $T_2$. Time $T_1$ and time $T_2$ differ from each other; $T_1:T_2=0.8:0.2$. Applied with the voltage having this specific waveform, the drive body 1 rotates to the right while the voltage has a positive (+) value and to the left while the voltage has a negative (−) value, as is illustrated in FIGS. 6 and 7.

Since the voltage changes as shown in FIG. 14, the drive body 1 bends through an angle proportional to the voltage, regardless of the rate at which the voltage changes. Assume that the drive body 1 slowly bends through +10° with respect to the shaft 2 when it is applied with +100V. Then, the shaft 2 is held and will not slip, because of the rotation-suppressing force. Its distal end portion bends through +10° as in the case of a cantilever. When the drive body 1 is applied with −100V and is thereby rapidly bent in the opposite direction, its distal end portion cannot bend as much as −10° due to the inertial force explained above. Although the drive body 1 tends to rotate by the angle corresponding to the voltage, its distal end portion cannot so much. As a result, the shaft 2 supporting the drive body 1 overcomes the rotation-suppressing force and slips in the direction opposite to the direction in which the distal end portion of the body 1 bends. Namely, the shaft 2 rotates.

Thus, the shaft 2 slips due to the inertial force generated from the difference in the deforming speed of the drive body 1, when the voltage of the waveform shown in FIG. 14 is applied to the drive body 1. The distal end of the drive body 1 therefore gradually rotates to the right as it slips, whereby the drive body 1 rotates counterclockwise. If the voltage falls more slowly than it rises, lengthening time $T_2$ and shortening time $T_1$, or if $T_1:T_2=0.2:0.8$, for example, the drive body 1 will rotate to the left (clockwise) in FIG. 7.

When the voltage having such a waveform as shown in FIG. 14 is applied to the drive body 1, it is possible to impart a sufficient difference in the deforming speed of the body 1 and to generate a force large enough to drive the body 1, provided that time $T_1$ and time $T_2$ are set at an appropriate ratio. Thus, this control method can greatly reduce the noise and quietness of the actuator can be improved, without decreasing the drive force much. The experiments conducted by the inventors hereof demonstrated that when the voltage having the waveform shown in FIG. 14 was applied, the noise was reduced to about 45 dB from about 65 dB, i.e., the value observed when the sawtooth-waveform voltage (FIG. 6) was applied.

Eighth Embodiment

Figure 15:
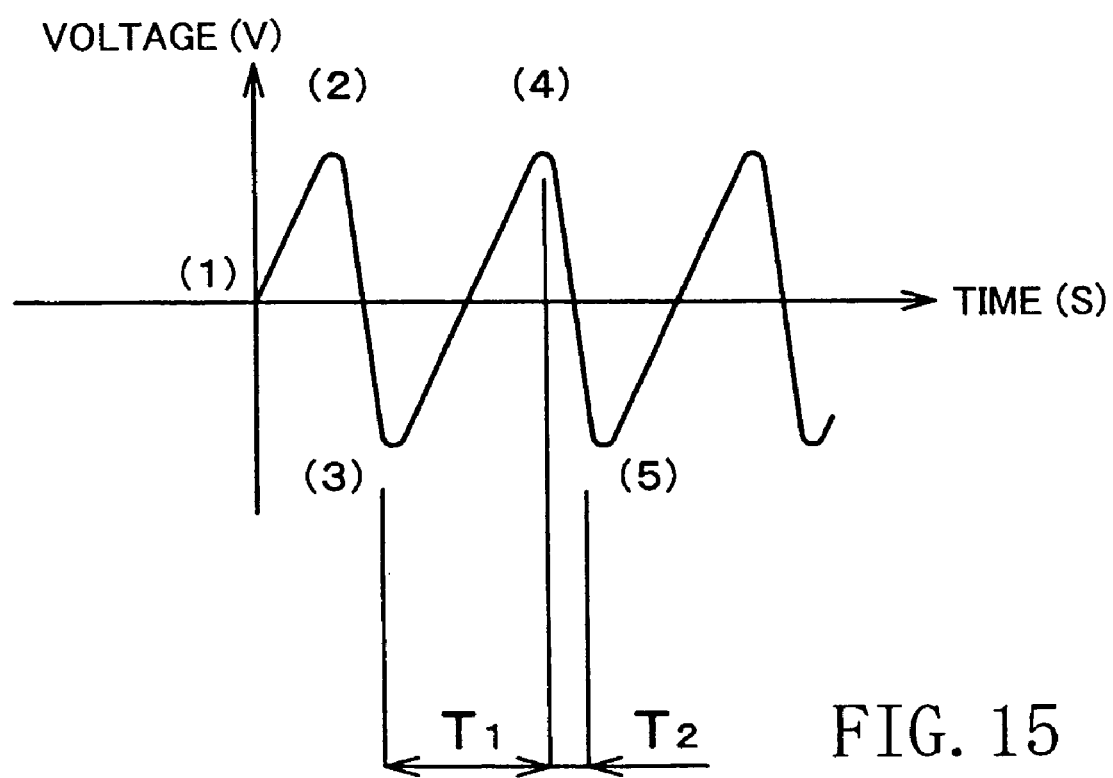
FIG. 15 is a diagram showing the waveform of a voltage applied in a method of controlling an actuator, which method is an eighth embodiment of the invention.

The eighth embodiment of the invention will be described. The eighth embodiment is a method of controlling the actuator 11 according to the first embodiment by applying a voltage that slowly changes near the maximum and minimum values (turning values), not sharply as is illustrated in FIG. 14. FIG. 15 is a diagram representing the waveform of the voltage applied to the actuator 11 in this method.

As FIG. 15 displays, the waveform of the voltage has a curvilinear part 61 at the positive (+) peak and the negative (−) peak. In other words, neither peak is a sharp edge. The voltage gradually changes at each peak. This helps to minimize the noise that the actuator 11 makes when the input voltage changes.

Figure 16:
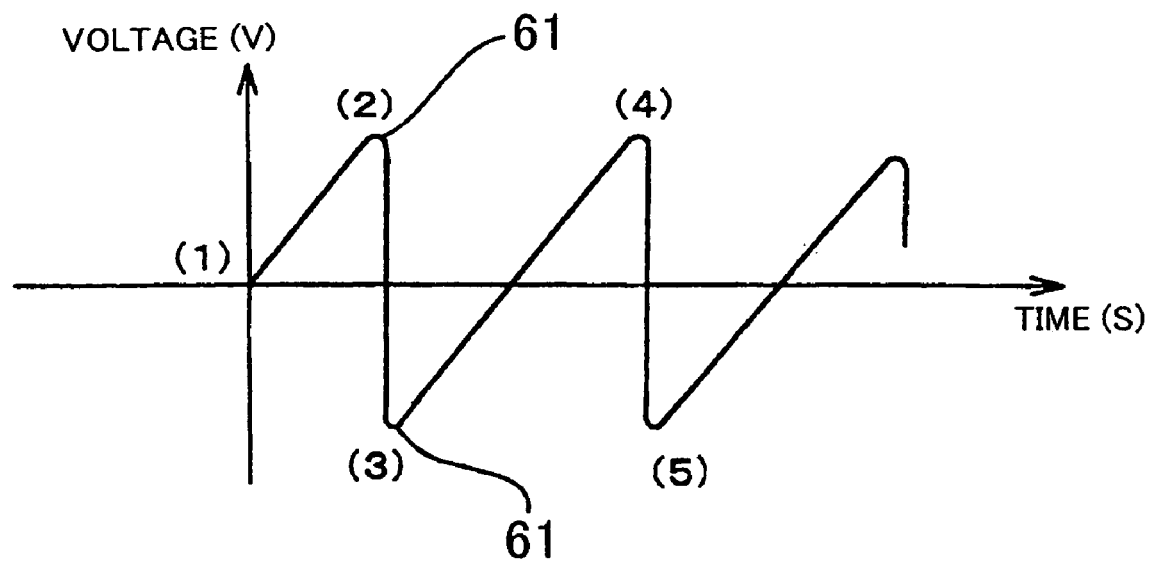
FIG. 16 is a diagram showing the waveform of a voltage that may be applied in place of the voltage illustrated in FIG. 15.

The noise reduction is effective to a sawtooth-waveform voltage as shown in FIG. 16. FIG. 16 is a diagram showing a modified form of the waveform shown in FIG. 15, which is corresponding to the case that the time $T_2$ is 0 ($T_2=0$) in FIG. 15. Although, the voltage rapidly falls from the maximum value to the minimum value, sharp edges are removed near the peaks by the curve 61. Since the voltage slowly changes at each peak, the noise that actuator 11 makes while operating is small.

Ninth Embodiment

Figure 17:
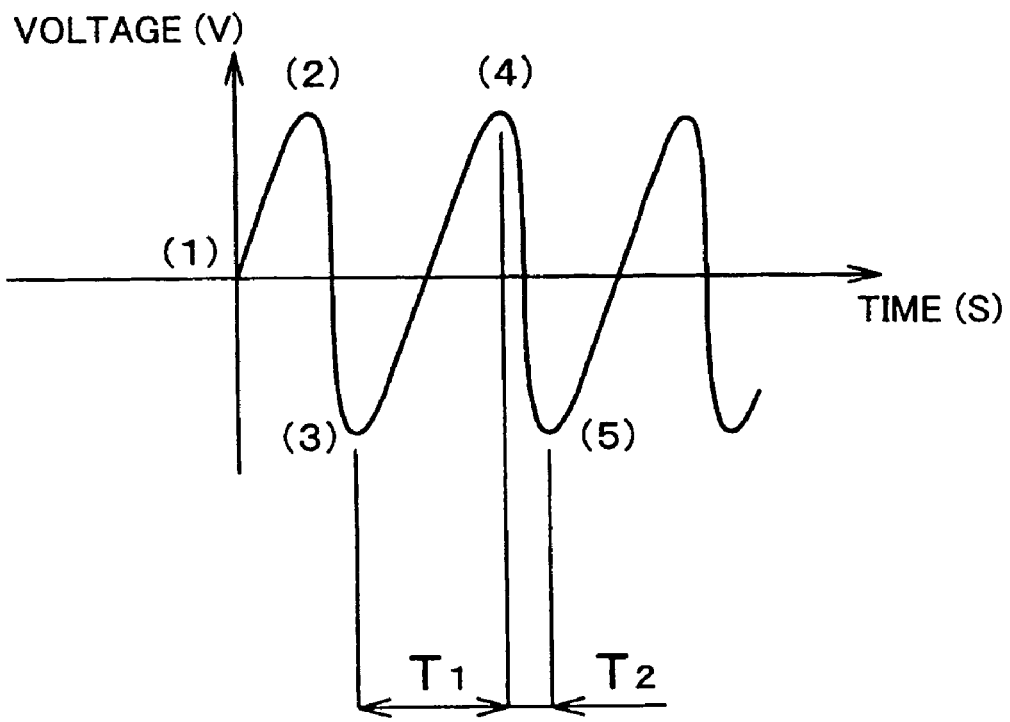
FIG. 17 is a diagram displaying the waveform of a voltage applied in a method of controlling an actuator, which method is a ninth embodiment of the present invention.

The ninth embodiment of this invention will be described. The ninth embodiment is a method of controlling the actuator 11 by applying a voltage having a sinusoidal waveform, which changes in magnitude and polarity with time. FIG. 17 is a diagram displaying the waveform of the voltage applied to the actuator 11 in this method.

As FIG. 17 shows, a voltage of a sinusoidal waveform has a frequency of 250 Hz and a potential difference of 200V between the maximum and minimum values. For this voltage, $T_1:T_2=0.8:0.2$. When applied with the voltage having this waveform, the drive body 1 moves as shown in FIG. 7, rotating clockwise around the shaft 2. Therefore, the drive body 1 generates a sufficient force for the actuator, and the operation noise can yet be small since the voltage does not change so rapidly.

Tenth Embodiment

Figure 18:
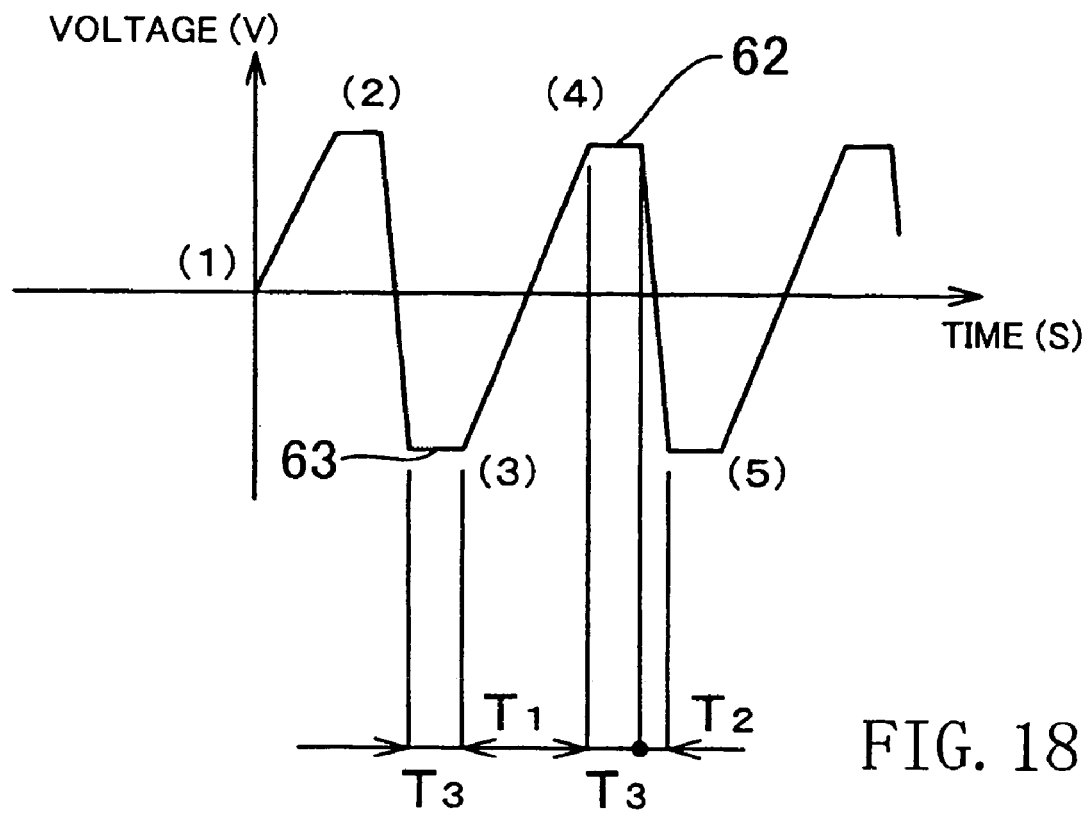
FIG. 18 is a diagram displaying the waveform of a voltage applied in a method of controlling an actuator, which method is a tenth embodiment of the invention.

The tenth embodiment of this invention will be described. The tenth embodiment is a method of controlling the actuator 11 by applying a voltage having a trapezoidal waveform. FIG. 18 is a diagram displaying the waveform of the voltage applied to the actuator 11 in this method.

As FIG. 18 shows, a voltage of a trapezoidal waveform, the maximum and minimum values of which remain unchanged for a specific time ($T_3$). The time $T_1$, during which the voltage rises from the minimum value to the maximum value is different from the time $T_2$ during which the voltage falls from the maximum value to the minimum value-, as indicated above. That is, $T_1:T_2=0.8:0.2$. When applied with the voltage having this waveform, too, the drive body 1 moves as shown in FIG. 7. Nonetheless, the peaks of the voltage are not sharp edges; the voltage remains at the maximum and minimum values for some time ($T_3$).

Figure 19:
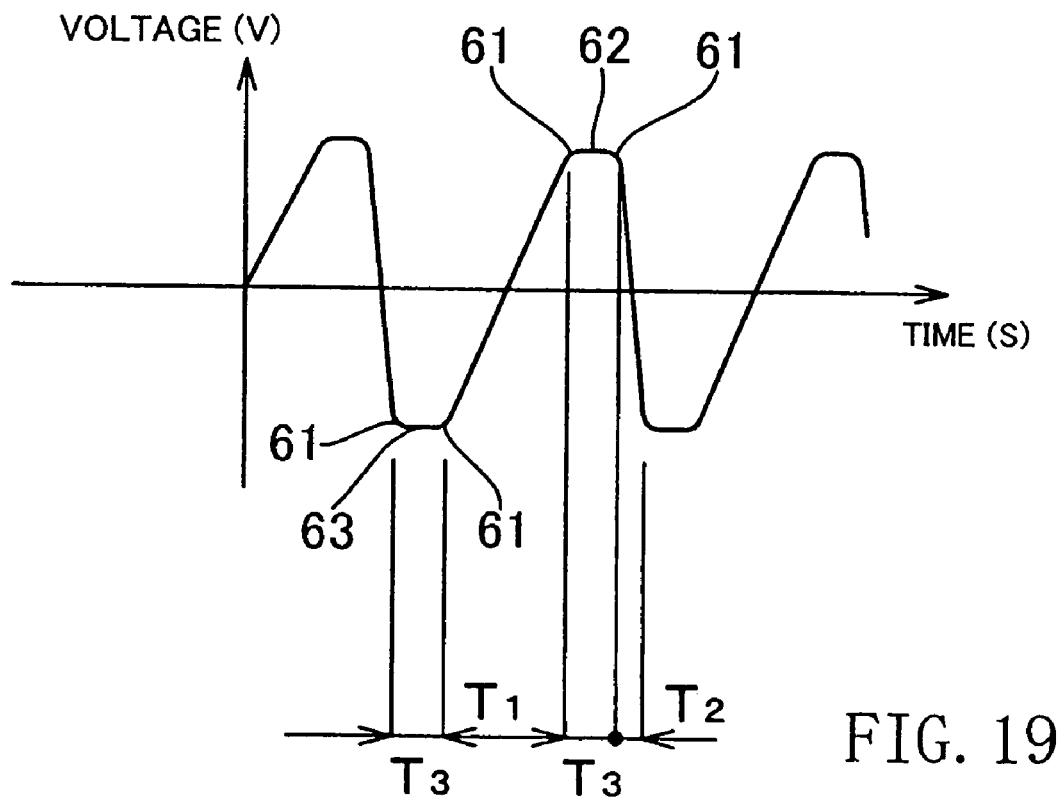
FIG. 19 is a diagram showing the waveform of a voltage that may be applied in place of the voltage shown in FIG. 18.

As shown in FIG. 19, a voltage having the curvilinear part 61 may be applied to the drive body 1. The voltage roundly changes near the peaks in the curvilinear part 61. Also, it is possible to make the curvilinear part 61 at both an upper base 62 and a lower base 63 on the trapezoidal waveform shown in FIG. 18. The voltage having a trapezoidal waveform can serve to reduce the noise because it changes gently at the peaks, even if $T_2=0$. The positive peak 62 and negative peak 63 of the trapezoidal waveform may be a curve or a zigzag wave.

A detailed description has hereinabove been given of the invention achieved by the present inventors with reference to the embodiments. However, the present invention should not be limited to the embodiments described above, and may be variously modified within the scope not departing from the gist.

For example, the rotation-suppressing force is applied in the form of a frictional force in the embodiments described above. Instead, the rotation-suppressing force may be applied by a magnetic brake or an electromagnetic brake. If the force is a frictional force, its source is not limited to a leaf spring. A coil spring, a rubber ring or the like, either mounted on or provided in the shaft, may be used to apply the rotation-suppressing force. Further, the leaf spring may be provided outside the actuator, not at the bearing section as in the embodiments. For example, the leaf spring 13 may be secured to the cover 32 in the case of the wiper 31.

Moreover, the drive body 1 need not vibrate in its entirety, so long as it can move as is illustrated in FIG. 7. The drive body 1 may be configured to vibrate at its distal portion only.

The dimensions specified of the drive body 1 are nothing more than an example. The body 1 may have any other dimensions.

In the embodiments described above, the ratio between the rising time $T_1$ and falling time $T_2$ of the voltage is: $T_1:T_2=0.8:0.2$. The ratio is not limited to this, nevertheless. To reduce the noise, while generating a sufficient drive force in the actuator, the ratio is preferably: $T_1:T_2=0.95:0.05$ to $0.8:0.2$ ($T_1:T_2=0.05:0.95$ to $0.2:0.8$, to drive the actuator in the opposite direction). A bimorph piezoelectric element is employed as the electromechanical transducer in the embodiments, but any other transducer, such as a quartz element, may be utilized instead. A voltage whose polarity changes with time is applied to the actuator 11 in the above embodiments. Nonetheless, a voltage that changes but remains positive or negative, not changing in polarity, may be applied to drive the actuator 11.

What is claimed is:

1. A method of controlling an actuator having a drive body which includes an electromechanical transducer that is operable to vibrate when a change of a voltage is applied thereto, a shaft member on which said drive body is mounted, a bearing section for supporting said shaft member and allowing said shaft member to rotate, and a resistance member for applying a rotation-suppressing force to said shaft member to suppress rotation of said shaft member, the method comprising:

applying a voltage to said electromechanical transducer such that the voltage increases linearly from a minimum value to a maximum value for a time T1 and decreases linearly from the maximum value to the minimum value for a time T2 that is different than the time T1.

2. The method of claim 1, wherein the voltage is applied so that the voltage changes along a curve near the maximum value and along a curve near the minimum value.

3. The method of claim 1, wherein the time T1 and the time T2 have a ratio T1:T2 ranging from 0.95:0.05 to 0.8:0.2.

4. The method of claim 1, wherein the time T1 and the time T2 have a ratio T1:T2 ranging from 0.05:0.95 to 0.2:0.8.

5. The method of claim 1, wherein said electromechanical transducer is a piezoelectric element.

6. A method of controlling an actuator having a drive body which includes an electromechanical transducer that is operable to vibrate when a change of a voltage is applied thereto, a shaft member on which said drive body is mounted, a bearing section for supporting said shaft member and allowing said shaft member to rotate, and a resistance member for applying a rotation-suppressing force to said shaft member to suppress rotation of said shaft member, the method comprising:

applying a voltage to said electromechanical transducer such that the voltage increases from a minimum value to a maximum value for a time T1 and decreases from the maximum value to the minimum value for a time T2 that is different than the time T1, wherein the voltage has a sinusoidal waveform.

7. The method of claim 6, wherein the time T1 and the time T2 have a ratio T1:T2 ranging from 0.95:0.05 to 0.8:0.2.

8. The method of claim 6, wherein the time T1 and the time T2 have a ratio T1:T2 ranging from 0.05:0.95 to 0.2:0.8.

9. The method of claim 6, wherein said electromechanical transducer is a piezoelectric element.

10. A method of controlling an actuator having a drive body which includes an electromechanical transducer that is operable to vibrate when a change of a voltage is applied thereto, a shaft member on which said drive body is mounted, a bearing section for supporting said shaft member and allowing said shaft member to rotate, and a resistance member for applying a rotation-suppressing force to said shaft member to suppress rotation of said shaft member, the method comprising:

applying a voltage to said electromechanical transducer, the voltage having a trapezoidal waveform remaining at a minimum value for a predetermined time and remaining at a maximum value for a predetermined time.

11. The method of claim 10, wherein the voltage changes along a curve at both ends of the upper and lower sides of the trapezoidal waveform.

12. The method of claim 10, wherein the voltage increases from the minimum value to the maximum value during a time T1 and decreases from the maximum value to the minimum value during a time T2 that is different than the time T1.

13. The method of claim 12, wherein the time T1 and the time T2 have a ratio T1:T2 ranging from 0.95:0.05 to 0.8:0.2.

14. The method of claim 12, wherein the time T1 and the time T2 have a ratio T1:T2 ranging from 0.05:0.95 to 0.2:0.8.

15. The method of claim 12, wherein said electromechanical transducer is a piezoelectric element.

16. The method of claim 10, wherein said electromechanical transducer is a piezoelectric element.

17. A method of controlling an actuator having a drive body which includes an electromechanical transducer that is operable to vibrate when a change of a voltage is applied thereto, a shaft member on which said drive body is mounted, a bearing section for supporting said shaft member and allowing said shaft member to rotate, and a resistance member for applying a rotation-suppressing force to said shaft member to suppress rotation of said shaft member, the method comprising:

applying a voltage to said electromechanical transducer, the voltage changing along a curve near a maximum value and along a curve near a minimum value.

* * * * *